(12) United States Patent
Ludemann et al.

(10) Patent No.: US 12,328,326 B2
(45) Date of Patent: Jun. 10, 2025

(54) ANOMALOUS USER INTERFACE INPUT DETECTION

(71) Applicant: Google LLC, Mountain View, CA (US)

(72) Inventors: Henry James Ludemann, Mountain View, CA (US); Walter Bogorad, Danville, CA (US)

(73) Assignee: Google LLC, Mountain View, CA (US)

( * ) Notice: Subject to any disclaimer, the term of this patent is extended or adjusted under 35 U.S.C. 154(b) by 248 days.

(21) Appl. No.: 17/776,664

(22) PCT Filed: Jun. 25, 2020

(86) PCT No.: PCT/US2020/039537
§ 371 (c)(1),
(2) Date: Nov. 2, 2022

(87) PCT Pub. No.: WO2021/262170
PCT Pub. Date: Dec. 30, 2021

(65) Prior Publication Data
US 2023/0061311 A1    Mar. 2, 2023

(51) Int. Cl.
G06F 21/36    (2013.01)
G06F 21/31    (2013.01)
H04L 9/40    (2022.01)

(52) U.S. Cl.
CPC ........ H04L 63/1425 (2013.01); G06F 21/316 (2013.01); H04L 63/107 (2013.01); H04L 63/1416 (2013.01); G06F 2221/2133 (2013.01)

(58) Field of Classification Search
CPC ............ H04L 63/1425; H04L 63/1416; G06F 21/316; G06F 2221/2133; G06F 21/554; G06Q 30/0248
See application file for complete search history.

(56) References Cited

U.S. PATENT DOCUMENTS 9,397,841 B2 * 7/2016 Godse .................. H04L 9/3271
2011/0016520 A1 1/2011 Cohen et al.
(Continued)

FOREIGN PATENT DOCUMENTS

CN    103530540    1/2014
CN    104516898    4/2015
(Continued)

OTHER PUBLICATIONS

Andy Greenberg, "Google Can Now Tell You're Not a Robot With Just One Click", Dec. 3, 2014, Wired, obtained online from <https://www.wired.com/2014/12/google-one-click-recaptcha/>, retrieved on Sep. 29, 2024 (Year: 2014).*

(Continued)

Primary Examiner — Zhimei Zhu
(74) Attorney, Agent, or Firm — Fish & Richardson P.C.

(57) ABSTRACT

Methods, systems, and apparatus, including computer programs encoded on computer storage media, for detecting anomalous user interface interactions. One of the methods includes receiving, for a user interface element, interaction locations that indicate where interactions with the user interface element occurred when the user interface element was provided on behalf of a first system; determining a difference between (i) a first distribution of the interaction locations for the user interface element when the user interface element was provided on behalf of the first system and (ii) a second distribution of the interaction locations for the user interface element when the user interface element was provided on behalf of a second system; classifying the first distribution of the interaction locations as anomalous in response to the difference not satisfying a condition; and preventing the first system from accessing another system to which the first system was trying to gain access.

17 Claims, 5 Drawing Sheets

Test Interaction Locations

Baseline Interaction Locations

(56) References Cited

U.S. PATENT DOCUMENTS

| | | | |
|---|---|---|---|
| 2012/0173315 A1 | 7/2012 | Martini et al. | |
| 2014/0201208 A1* | 7/2014 | Satish | G06F 21/564 |
| | | | 707/737 |
| 2016/0080405 A1* | 3/2016 | Schler | H04L 63/1408 |
| | | | 726/23 |
| 2017/0359372 A1* | 12/2017 | Ronen | H04L 63/1416 |
| 2018/0239888 A1 | 8/2018 | Guo | |
| 2019/0236250 A1 | 8/2019 | Paxton et al. | |
| 2019/0340393 A1 | 11/2019 | Mo et al. | |
| 2020/0403634 A1* | 12/2020 | Zhang | H03M 13/1111 |
| 2021/0034206 A1* | 2/2021 | Yap | G06F 3/038 |
| 2021/0079866 A1* | 3/2021 | Liu | G06Q 30/0241 |
| 2021/0365548 A1* | 11/2021 | Liu | G06F 21/552 |

FOREIGN PATENT DOCUMENTS

| | | |
|---|---|---|
| CN | 105389704 | 3/2016 |
| CN | 105718783 | 6/2016 |
| CN | 107846412 | 3/2018 |
| CN | 108665297 | 10/2018 |
| CN | 108881126 | 11/2018 |
| CN | 109918891 | 6/2019 |
| CN | 109933970 | 6/2019 |
| JP | 2008-135030 | 6/2008 |
| JP | 2008-191722 | 8/2008 |
| JP | 2013-190992 | 9/2013 |
| JP | 2019-510283 | 4/2019 |
| KR | 10-2019-0126201 | 11/2019 |
| WO | WO-2009132148 A2 * | 10/2009 ............. G06F 21/32 |

OTHER PUBLICATIONS

V. Avdiienko, K. Kuznetsov, I. Rommelfanger, A. Rau, A. Gorla and A. Zeller, "Detecting Behavior Anomalies in Graphical User Interfaces," 2017 IEEE/ACM 39th International Conference on Software Engineering Companion (ICSE-C), Buenos Aires, Argentina, 2017, pp. 201-203 (Year: 2017).*
Office Action in Chinese Appln. No. 202080083197.3, mailed on May 14, 2024, 20 pages (with English translation).
International Search Report and Written Opinion in International Appln. No. PCT/US2020/039537, mailed on Mar. 9, 2021, 15 pages.
Office Action in Indian Appln. No. 202227026210, dated Feb. 16, 2023, 6 pages (with English translation).
Notice of Allowance in Japanese Appln. No. 2022-533182, mailed on Sep. 4, 2023, 5 pages (with English translation).
Office Action in European Appln. No. 20742993.7, mailed on Aug. 22, 2023, 6 pages.
Office Action in Korean Appln. No. 10-2022-7018261, mailed on Sep. 14, 2023, 11 pages (with English translation).
International Preliminary Report on Patentability in International Appln. No. PCT/US2020/039537, mailed on Jan. 5, 2023, 9 pages.
Notice of Allowance in Korean Appln. No. 10-2022-7018261, mailed on Feb. 27, 2024, 3 pages (with English translation).
Office Action in Chinese Appln. No. 202080083197.3, mailed on Dec. 7, 2023, 19 pages (with English translation).
Zhang et al., "Verification Code based on natural image mixture" Journal of Liaoning University of Science and Technology, Feb. 2017, 4 pages (with English abstract).

* cited by examiner

ANOMALOUS USER INTERFACE INPUT DETECTION

CROSS-REFERENCE TO RELATED APPLICATIONS

This application is a National Stage Application under 35 U.S.C. § 371 and claims the benefit of International Application No. PCT/US2020/039537, filed Jun. 25, 2020. The disclosures of the foregoing applications are incorporated herein by reference in their entirety.

BACKGROUND

User interfaces can receive input from a pointing device. Some example pointing devices include a mouse, a touchpad, and a touch screen. The user interface can perform actions based on the received input. Some actions include opening a menu, directing the user interface to present another content screen, e.g., content for a uniform resource identifier ("URI"), or launching an application.

SUMMARY

Some systems may need to detect anomalous pointing device input. For instance, a CAPTCHA challenge-response system can attempt to distinguish input generated by a human from input generated by an automated system.

To better distinguish between human and automated input, an anomalous activity detection system can analyze the locations at which a user interface received input, e.g., at which a CAPTCHA challenge received input. The anomalous activity detection system can compare the locations with baseline locations to determine whether the locations differ by more than a threshold amount from the baseline locations. Some examples of baseline locations include locations the anomalous activity detection system has determined are likely not anomalous, e.g., location data received from trusted systems, or locations from a number of different systems that have a threshold likelihood of being non-anomalous.

The similarity in distributions of the locations, e.g., when the locations do not differ from the baseline locations by more than the threshold amount, can indicate a likelihood that the locations were based on human input or automated input. For instance, when the baseline locations represent non-anomalous, human input, there is a first distribution pattern for the locations. When the locations analyzed by the anomalous activity detection system have a similar distribution pattern, the anomalous activity detection system can determine that the locations are likely non-anomalous. But when the locations do not have a similar distribution pattern, the anomalous activity detection system can determine that the locations are likely anomalous, e.g., generated by an automated system, such as a computer bot.

When a distribution of the locations does not differ by more than the threshold amount, the anomalous activity detection system can enable a system for which the input was received to continue to access user interface content. For instance, the anomalous activity detection system can send a message, to a content server, that indicates that the content server should continue to provide content, e.g., CAPTCHA challenges, to the system for which the input was received. When the distribution of the locations differs by more than the threshold amount from the baseline location distribution, the anomalous activity detection system can prevent the system's access to the content server, cause the content server to change a type of content provided to the system, or perform some other appropriate activity.

The anomalous activity detection system can determine whether an amount of the locations for a particular user interface element satisfies a threshold quantity rule. When the amount of locations does not satisfy the threshold quantity rule, e.g., is less than a threshold quantity, the anomalous activity detection system can analyze data for multiple user interface elements associated with the system. In this way, the anomalous activity detection system can detect anomalous input interactions with multiple user interface elements provided to the system when it could be unable to detect anomalous input interactions with any individual user interface element from the multiple user interface elements. When the amount of locations satisfies the threshold quantity rule, the anomalous activity detection system can analyze data for a single user interface element provided to the system.

The system for which the anomalous activity detection system analyzes user interface elements can be any appropriate type of system. For instance, the system can be a system that presents webpages to a user, e.g., after presenting CAPTCHA images. In some examples, the system can host webpages, content for which are provided to client devices. The anomalous activity detection system can analyze the user interface elements based on input received from the client devices.

In general, one aspect of the subject matter described in this specification can be embodied in methods that include the actions of receiving, for a user interface element, interaction locations that indicate where interactions with the user interface element occurred when the user interface element was provided on behalf of a first system; determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system; classifying the first distribution of the interaction locations as anomalous in response to the difference not satisfying a condition; and preventing the first system from accessing another system to which the first system was trying to gain access in response to classifying the first distribution of the interaction locations as anomalous. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include receiving, for the user interface element, second interaction locations that indicate where interactions with the user interface element occurred when the user interface element was provided on behalf of a third system; determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system; classifying the first distribution of the second interaction locations as not anomalous in response to the second difference satisfying the condition; and determining to allow the third system to access another system to which the third system was trying to gain access in response to classifying the first distribution of the second interaction locations as not anomalous.

In some implementations, the method can include receiving, for the user interface element that has a first element type, second interaction locations that indicate where interactions with the user interface element occurred when the user interface element was provided on behalf of a third system; determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system; classifying the first distribution of the second interaction locations as anomalous in response to the second difference not satisfying the condition; and in response to classifying the first distribution of the second interaction locations as anomalous: preventing, at another system and for the user interface element that has the first element type, the third system from accessing all user interface elements that have the first element type; and enabling the third system's access to user interface elements that have a second, different element type.

In some implementations, preventing the first system from accessing the other system can include preventing, at the other system and for the user interface element that has a first element type, the first system from accessing all user interface elements that have the first element type; and enabling the first system's access to user interface elements that have a second, different element type. Determining the difference between (i) the first distribution of the interaction locations and (ii) the second distribution of the interaction locations can include iteratively analyzing data for one or more portions of the user interface element, beginning with a current portion that includes all of the user interface element and is associated with a current subset of first interaction locations from the first distribution of the interaction locations and a current subset of second interaction locations from the second distribution of the interaction locations. The iterative analyzing can include determining whether a quantity of interaction locations in the current subset satisfies a second condition; and in response to determining that the quantity of interaction locations in the current subset does not satisfy the second condition and for at least one system, stopping the iterative analysis of the one or more portions of the user interface element.

In some implementations, the method can include, in response to determining that the quantity of interaction locations in the current subset satisfies the second condition and for at least one system, dividing the current portion into one or more new portions and performing the iterative analysis on the one or more new portions. Determining the difference between (i) the first distribution of the interaction locations and (ii) the second distribution of the interaction locations can be responsive to determining that the quantity of interaction locations in the current subset satisfies the second condition. For a first iteration of the iterative analysis of the data, determining whether the quantity of interaction locations in the current subset satisfies the second condition can occur before determining the difference between (i) the first distribution of the interaction locations and (ii) the second distribution of the interaction locations.

In some implementations, determining the difference between (i) the first distribution of the interaction locations and (ii) the second distribution of the interaction locations can include iteratively analyzing data for one or more portions of the user interface element, beginning with a current portion that includes all of the user interface element and is associated with a current subset of first interaction locations from the first distribution of the interaction locations and a current subset of second interaction locations from the second distribution of the interaction locations. The iterative analyzing can include determining whether a predetermined quantity of iterations is satisfied; and in response to determining that the predetermined quantity of iterations is satisfied and for at least one system, stopping the iterative analysis of the one or more portions of the user interface element.

In some implementations, the method can include receiving, for the user interface element, second interaction locations that indicate where interactions with the user interface element occurred when the user interface element was provided on behalf of a third system; determining, for the third system, whether a quantity of the second interaction locations for the user interface element when the user interface element was provided on behalf of the third system satisfies a third condition; in response to determining that the quantity of the second interaction locations satisfies the third condition, determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system; classifying the first distribution of the second interaction locations as anomalous in response to the second difference not satisfying the condition; and preventing the third system from accessing another system to which the third system was trying to gain access in response to classifying the first distribution of the second interaction locations as anomalous.

In some implementations, the method can include receiving, for the user interface element, second interaction locations that indicate where interactions with the user interface element occurred when the user interface element was provided on behalf of a third system; determining, for the third system, whether a quantity of the second interaction locations for the user interface element when the user interface element was provided on behalf of the third system satisfies a third condition; in response to determining that the quantity of the second interaction locations does not satisfy the third condition: receiving, for two or more user interface elements, third interaction locations that indicate interaction locations for a respective user interface element from the two or more user interface elements when the respective user interface element was provided on behalf of a system; determining, based on the received second interaction locations, a second difference between (i) a first distribution of the third interaction locations that indicate interaction locations for a respective user interface element from two or more user interface elements when the respective user interface element was provided on behalf of the third system and (ii) a second distribution of the third interaction locations that indicate interaction locations for a respective user interface element from two or more user interface elements when the respective user interface element was provided on behalf of a fourth system; classifying the first distribution of the third interaction locations as anomalous in response to the second difference not satisfying the condition; and preventing the third system from accessing another system to which the third system was trying to gain access in response to classifying the first distribution of the second interaction locations as anomalous.

In some implementations, receiving, for the user interface element, the interaction locations can include receiving, for the user interface element and from the interaction locations, one or more interaction locations that were generated using data received from a touch screen input device, a touch pad device, or a computer mouse input device.

The subject matter described in this specification can be implemented in various embodiments and may result in one or more of the following advantages. In some implementations, the systems and methods described below can improve security, reduce fraudulent user interface interaction, or both. For example, an anomalous activity detection system can detect automated systems attempting to access content to which they should not have access, e.g., to which only humans should have access, and prevent the automated system's access to the content. This can improve security when the automated system is trying to gain brute force access to an account, e.g., when the automated system provides an automated CAPTCHA response and attempts to login to an account. This can prevent fraud when the automated system generates and provides automatically generated data to another system that receives data based on human input. The automatically generated data can be fake news data, fake social media data, datacenter traffic attack data, botnet data, invalid implementation data, clickjacking data, or other similar data types. In some implementations, an anomalous activity detection system can detect anomalous activity by automated systems that use a combination of data based on human input and data automatically generated by a system that can be difficult for other systems to detect. In some implementations, an anomalous activity detection system can detect anomalous activity that would otherwise be imperceptible to a human, e.g., by iteratively analyzing one or more portions of a user interface element. In some implementations, an anomalous activity detection system can filter anomalous interactions with user interface elements. For instance, an anomalous activity detection system can prevent a system for which a user interface element is provided, e.g., to which a system that generated anomalous activity was trying to gain access, from performing an action based on anomalous interactions with the user interface element.

The described subject matter can prevent automated systems from repeatedly accessing or trying to access user interface elements. This reduces the number of user interface elements that need to be generated and distributed by a system and therefore reduce processing and bandwidth requirements. Since access requests by automated systems can be filtered out according to the described subject matter, available processing capacity and bandwidth can be dedicated to legitimate access requests and therefore can make more efficient use of available processing capacity and bandwidth. Since automated systems may make large numbers of access requests in a short amount of time, filtering out these access requests is of substantial benefit to systems that generate and distribute the user interface elements. Moreover, the described subject matter can improve the accuracy of determinations as to whether an access request is made by an automated system, which can increase the security of systems. This can prevent automated systems from distributing automatically generated data to or through such systems, which can reduce processing and bandwidth requirements of such systems. Since automated systems can generate large amounts of automatically generated data in a short amount of time, preventing automated systems from distributing such automatically generated data is of substantial benefit to the systems which are involved in receiving and distributing data. The described subject matter can harness the ability of computational systems to determine and communicate specific locations at which interactions occur on a user interface element, and to utilize data identifying these interaction locations from multiple different user interface elements and multiple different systems, which can increase the accuracy and security of the described systems.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
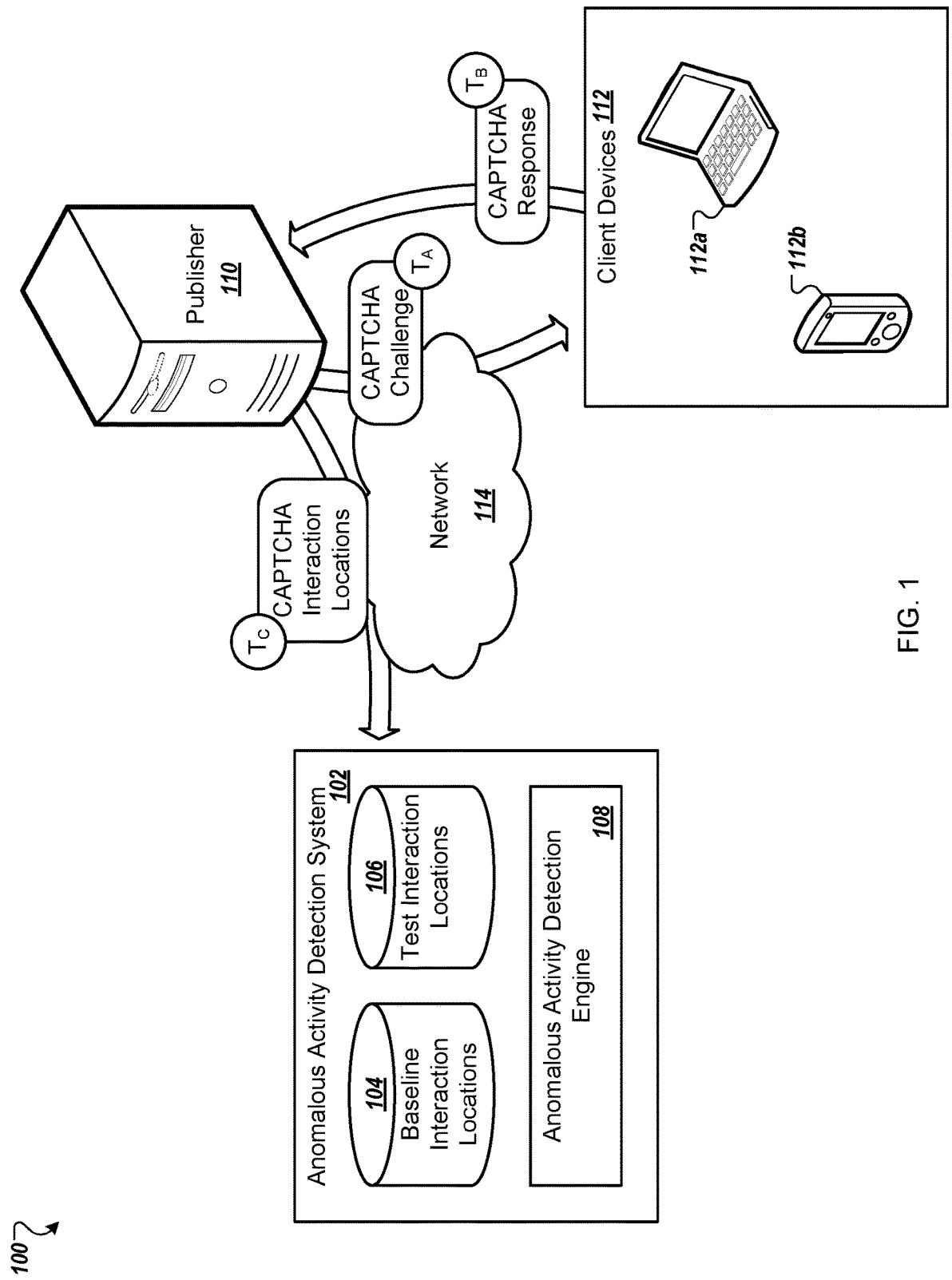
FIG. 1 depicts an example environment that includes an anomalous activity detection system.

FIG. 1 depicts an example environment 100 that includes an anomalous activity detection system 102. The anomalous activity detection system 102 analyzes data that indicates interactions with user interface elements, e.g., menu options, images, CAPTCHA challenges, or other appropriate user interface elements. The anomalous activity detection system 102 can determine that the interaction data is anomalous by comparing baseline interaction locations 104 with test interaction locations 106. The baseline interaction locations 104 can indicate user interface element locations that represent non-anomalous user interface element interactions, e.g., locations at which a user interface element received input based on input from a device operated by a person. The test interaction locations 106 can indicate, for a system being analyzed, locations at which the user interface element received input.

The anomalous activity detection system 102 uses a difference between the baseline interaction locations 104 and the test interaction locations 106, for the same one or more user interface elements, to determine whether the test interaction locations 106 are likely anomalous. For instance, the anomalous activity detection system 102 can generate a score for a system being tested that represents the likelihood that test interaction locations 106 for the system are anomalous. The anomalous activity detection system 102 can use a probability value for the baseline interaction locations 104, the test interaction locations 106, or both, to generate the score.

The anomalous activity detection system 102 can use an anomalous activity detection engine 108 to determine whether at least some user interface interactions for a publisher 110 are potentially anomalous. The publisher 110 can be any appropriate system that receives data that indicates interaction with user interface elements and need not be a content publisher. For instance, the publisher 110 can be a security system that restricts access to content.

During time period $T_A$, the publisher 110 provides a CAPTCHA challenge to a client device 112. Over time, the publisher 110 provides multiple CAPTCHA challenges to multiple different client devices 112a-b. This includes providing the same CAPTCHA challenge to at least two different client devices 112a-b. For instance, the publisher 110 can provide a first CAPTCHA challenge for selecting fire hydrants to sixty client devices 112, a second CAPTCHA challenge for selecting highway exit signs to fifteen client devices 112, and a third CAPTCHA challenge for selecting water puddles to forty-five client devices 112. The CAPTCHA challenges can be any appropriate CAPTCHA challenges or any other appropriate type of user interface element, e.g., images, icons, or other data representing a user interface element.

During time period $T_B$, the publisher 110 receives CAPTCHA responses from the client device 112. For instance, when the publisher 110 provided multiple CAPTCHA challenges to different client devices 112a-b, the publisher 110 receives corresponding CAPTCHA responses from the client devices 112a-b during the time period or time periods $T_B$. The publisher 110 can receive, with the CAPTCHA responses or as part of the CAPTCHA responses, data that indicates interaction locations. The interaction locations can be based on touch screen input, computer mouse input, or any other appropriate type of input that indicates selection of a corresponding user interface element for a CAPTCHA response.

The data that indicates interaction locations can be data received by a user interface that presented the corresponding user interface element, e.g., a CAPTCHA challenge, and indicate a location within the corresponding user interface element that was selected. For instance, when the CAPTCHA challenge requests selection, from nine images, of the images that depict fire hydrants, the data can indicate, for each of the three of the images, the location within the user interface element, e.g., image, at which the user interface received input. The interaction location data can be in any appropriate form. The data that indicates an interaction location can be in the form of x-y coordinates, e.g., with respect to a reference point in the corresponding image or the user interface.

In some implementations, the publisher 110 can perform one or more actions in response to receiving the CAPTCHA response. For example, when the CAPTCHA response matches an expected response for a corresponding CAPTCHA challenge, the publisher 110 can provide access to content stored on the publisher 110, such as a news article, a forum, or other appropriate content.

During time periods $T_C$, the publisher 110 provides data for the CAPTCHA interaction locations to the anomalous activity detection system 102. For instance, the anomalous activity detection system 102 receives the interaction location data from the publisher 110 using any appropriate communication protocol, e.g., using a network 114. The anomalous activity detection system 102 can receive the interaction locations on a periodic basis, e.g., monthly, based on receipt of the data by the publisher 110, or at any other appropriate time.

The anomalous activity detection engine 108 analyzes the received CAPTCHA interaction locations, i.e., as the test interaction locations 106. For example, the anomalous activity detection engine 108 determines whether a difference between the baseline interaction locations 104 and the test interaction locations 106 satisfies a threshold difference. The threshold difference can indicate a likelihood that the test interaction locations 106 are anomalous, e.g., generated by an automated system.

The anomalous activity detection engine 108 can compare the baseline interaction locations 104 and the test interaction locations 106 using distributions for the respective data. For instance, the anomalous activity detection engine 108 can detect a first distribution of the baseline interaction locations 104 for a user interface element, e.g., a CAPTCHA challenge, and a second distribution of the test interaction locations 106. The distributions can represent locations within the respective user interface element at which the user interface element received input.

The anomalous activity detection engine 108 performs analysis based on interaction locations for the same user interface element used by multiple different systems. For instance, the publisher 110 and a security system can provide a fire hydrant CAPTCHA challenge to devices requesting access to content. The publisher 110 can receive sixty CAPTCHA responses for the fire hydrant CAPTCHA challenge. The security system can receive two-hundred and nineteen CAPTCHA responses for the fire hydrant CAPTCHA challenge.

The anomalous activity detection engine 108 can use the CAPTCHA interaction locations for the publisher 110 as the test interaction locations 106 to determine whether activity on the publisher 110 is anomalous. The anomalous activity detection engine 108 can use CAPTCHA interaction locations for the security system as the baseline interaction locations 104, e.g., when the interaction locations for the security system satisfy a threshold likelihood of not being anomalous.

The anomalous activity detection system 102 can use, as the baseline interaction locations 104, data for various systems that have previously been determined as not likely having anomalous data or whose anomalous data is likely less than a threshold amount. For instance, the anomalous activity detection system 102 can use data for the security system, or a combination of multiple different systems, as the baseline interaction locations 104, each of which have been verified as satisfying a threshold likelihood of having non-anomalous data using the methods described in this document or another appropriate method.

The anomalous activity detection engine 108 compares a distribution in the interaction locations of the baseline interaction locations 104 and the test interaction locations 106. For example, the anomalous activity detection engine 108 compares the interaction locations for the first distribution of the two-hundred and nineteen interaction locations for the security system and the second distribution of the sixty interaction locations for the publisher 110.

When the anomalous activity detection engine 108 determines that the distributions satisfy a threshold difference, e.g., a difference is less than the threshold difference, as described in more detail below, the anomalous activity detection engine 108 can classify the interaction locations for the publisher 110 as likely not anomalous. When the anomalous activity detection engine 108 determines that the distributions do not satisfy a threshold difference, e.g., a difference is greater than the threshold difference, the anomalous activity detection engine 108 can classify the interaction locations for the publisher 110 as likely anomalous.

The anomalous activity detection system 102 can perform an action based on the anomaly classification. When the anomalous activity detection system 102 determines that interaction locations are not likely anomalous, the anomalous activity detection system 102 can determine to allow the publisher's 110 access to a system that hosts the user interface elements, e.g., a CAPTCHA security system that stores data for the CAPTCHA challenges and the CAPTCHA responses.

When the anomalous activity detection system 102 determines that interaction locations are likely anomalous, the anomalous activity detection system 102 can prevent the publisher 110 from accessing a system that uses the user interface elements, e.g., for the fire hydrant CAPTCHA challenge and response. For instance, the anomalous activity detection system 102 can determine that interaction data for the publisher 110 does not correspond to the distribution for interaction locations in the baseline interaction locations 104, e.g., when the distribution for the test interaction locations 106 is more than two standard deviations away from the distribution for the baseline interaction locations 104, and appears to be generated by an automated system.

The automated system can be the publisher 110, e.g., when the publisher 110 is infected with a form of malware and is generating requests on its own. This can occur when malware on the publisher 110 is requesting CAPTCHA challenges, and generating CAPTCHA responses, to gain access to data stored on the publisher 110 or another system from which the publisher 110 requests data, e.g., a content server.

The anomalous activity detection engine 108 can perform the analysis based on a quantity of interaction locations for a user interface element. For instance, the anomalous activity detection engine 108 can determine that the fifteen highway exit sign CAPTCHA challenges sent by the publisher 110 does not satisfy a threshold quantity, e.g., is less than the threshold quantity. In response, the anomalous activity detection engine 108 can then determine to perform analysis for the publisher 110 using interaction locations for multiple user interface elements, e.g., both the highway exit sign CAPTCHA challenge and the water puddle CAPTCHA challenge, when a quantity of interaction locations for a combination of the elements satisfies the threshold quantity.

For example, when the threshold quantity is fifty, the anomalous activity detection engine 108 can compare the interaction locations for the fifteen highway exit sign CAPTCHA challenges and the interaction locations for the forty-five water puddle CAPTCHA challenges with corresponding interaction locations for the same CAPTCHA challenges from the baseline interaction locations 104.

The time periods $T_A$, $T_B$, and $T_C$ can occur in different orders, overlap partially or in whole, or a combination of these. For instance, the publisher 110 can provide a first CAPTCHA challenge $T_A$ to a first device, and substantially concurrently receive a first CAPTCHA response $T_B$ while providing a second CAPTCHA challenge $T_A$ to another device. The publisher 110 can accumulate data for the CAPTCHA responses and then provide the accumulated data to the anomalous activity detection system 102. The overlapping of these time periods can provide faster and more efficient determinations of anomalous or non-anomalous distributions of interaction locations. The accumulation of the data and provision of the accumulated data can provide more efficient transmission of data relative to providing a single transmission for each CAPTCHA response through lower data transfer overheads.

In some implementations, the anomalous activity detection system 102 receives the interaction location data from another system other than the publisher 110. For instance, the publisher 110 can host news content and use a third party system for CAPTCHA challenges and responses. When the third party system determines that a CAPTCHA response is valid, e.g., matches an expected response for a corresponding CAPTCHA challenge, the publisher 110 can provide access to the hosted news content, e.g., for one of the client devices 112. The third party system can then provide the CAPTCHA interaction locations, or data for interaction locations of other user interface elements, to the anomalous activity detection system 102 to enable the anomalous activity detection system 102 to determine whether interactions for the publisher 110 are likely anomalous. In some examples, the anomalous activity detection system 102 can determine that the interaction location data is likely anomalous when a client device 112 requesting data from the publisher 110 is part of a botnet that is posting fake news, or fake user comments, on the publisher 110.

When preventing access to a system upon determining that interaction location data is likely anomalous, the anomalous activity detection system 102 can send a message to the system that causes the system to change one or more settings to prevent access to the system. For instance, the anomalous activity detection system 102 can send a message to the system that causes the system to block all incoming messages from the client device 112, to implement malware remedial measures, or to perform another action.

The anomalous activity detection system 102 is an example of a system implemented as computer programs on one or more computers in one or more locations, in which the systems, components, and techniques described in this document are implemented. The client devices 112 may include personal computers, mobile communication devices, and other devices that can send and receive data over a network 114. The network 114, such as a local area network (LAN), wide area network (WAN), the Internet, or a combination thereof, connects the anomalous activity detection system 102, the client devices 112, and the publisher 110. The anomalous activity detection system 102 may use a single server computer or multiple server computers operating in conjunction with one another, including, for example, a set of remote computers deployed as a cloud computing service.

The anomalous activity detection system 102 can include several different functional components, including the anomalous activity detection engine 108. The anomalous activity detection engine 108 can include one or more data processing apparatuses. For instance, the anomalous activity detection engine 108 can include one or more data processors and instructions that cause the one or more data processors to perform the operations discussed herein.

The various functional components of the anomalous activity detection system 102 may be installed on one or more computers as separate functional components or as different modules of a same functional component. For example, the anomalous activity detection engine 108 can be implemented as a computer program installed on one or more computers in one or more locations that are coupled to each through a network. In cloud-based systems for example, these components can be implemented by individual computing nodes of a distributed computing system.

Figure 2A:
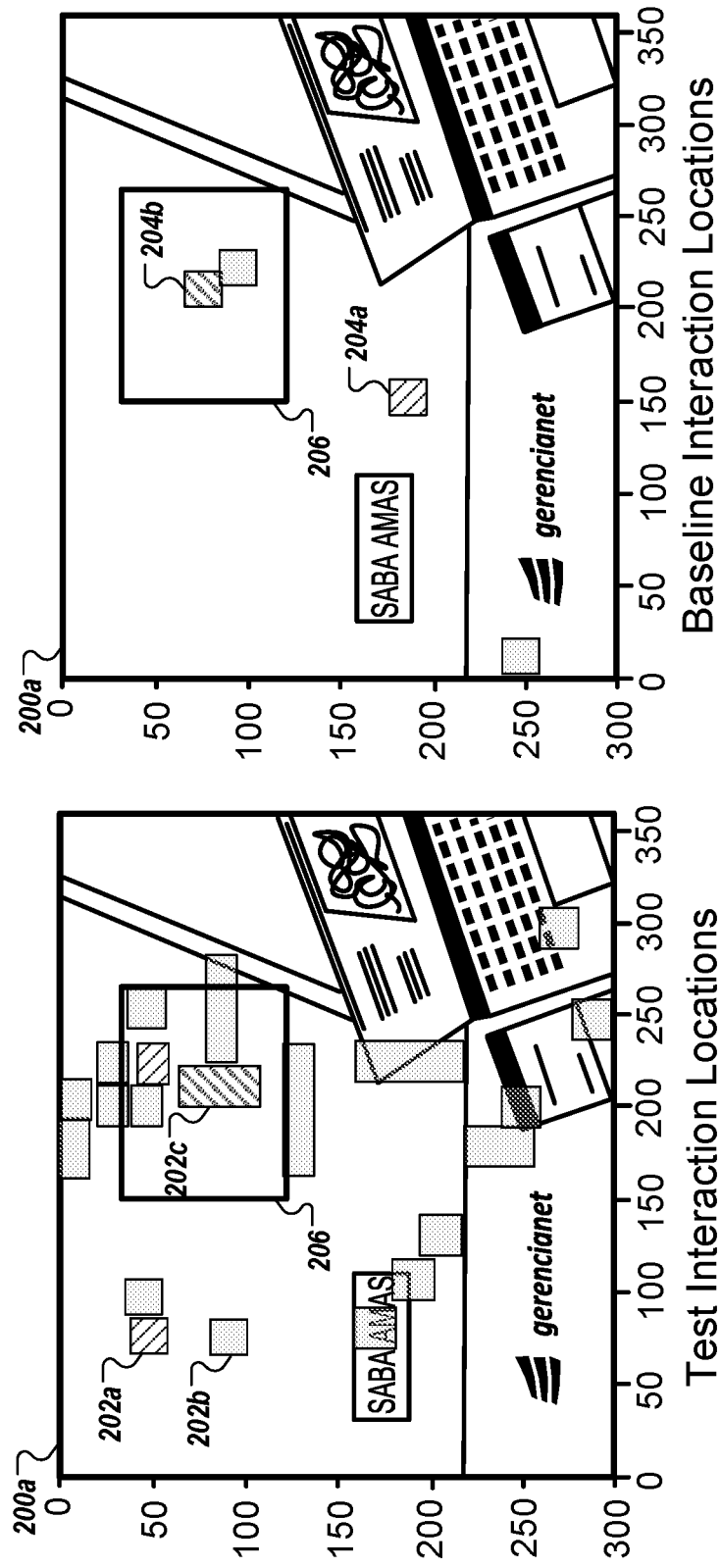
FIGS. 2A-B depict examples of interaction location distributions for user interface elements.
Figure 2B:
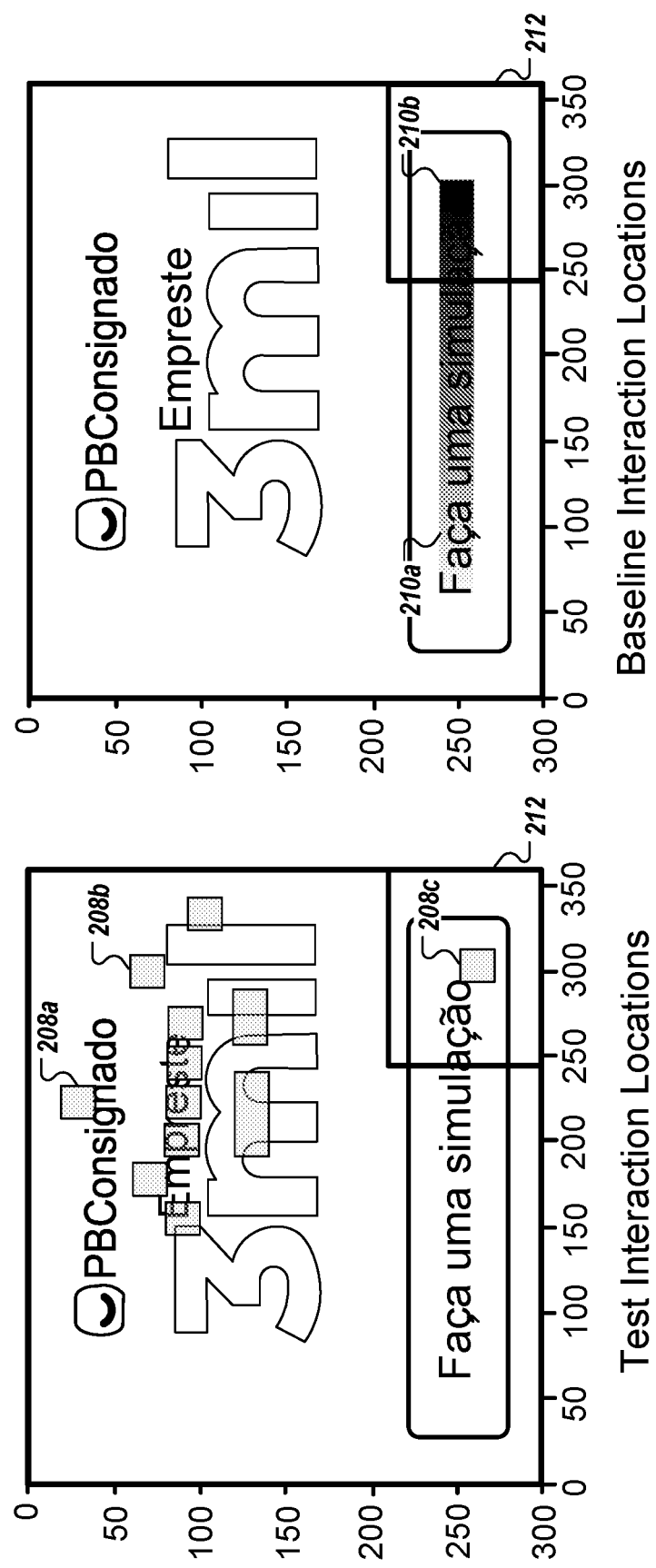

FIGS. 2A-B depict examples of interaction location distributions for user interface elements 200a-b. FIG. 2A depicts a number of test interaction locations 202a-c and a number of baseline interaction locations 204a-b, both for a first user interface element 200a. The different shading for the test interaction locations 202a-c and the baseline interaction locations 204a-b can represent a different quantity of interactions with the respective area of the first user interface element 200a.

An anomalous activity detection system can determine, for a first portion 206 of the first user interface element, a number of interaction locations 202, 204 in the first portion 206, a fraction of the interaction locations in the first portion 206, or another appropriate number based on the interaction locations for the first portion 206. The interaction locations in the first portion 206 can be a subset of the interaction locations in the distribution for the first user interface element 200a, either for the test interaction locations 202a-c or the baseline interaction locations 204a-b, respectively.

The first portion 206 can be any appropriate region of the first user interface element 200a. For instance, the anomalous activity detection system can divide the user interface element into multiple portions and analyze test interaction locations 202a-c and baseline interaction locations 204a-b for each of the portions separately, in parallel, or both. The multiple portions can be based on a grid for the first user interface element 200a, e.g., with rows and columns such that each portion has the same size. For example, the anomalous activity detection system can use a 1×2, 2×1, 2×2, or 3×3 grid of portions within a user interface element. The anomalous activity detection system can generate the portions based on the distributions of the interaction locations. For instance, the anomalous activity detection system can determine where the first user interface element 200a includes interaction locations, either baseline, test, or both, and select an area for the first portion 206 that includes at least a subset of the interaction locations.

The anomalous activity detection system can determine a fraction of the interaction locations in the first portion 206 with respect to a total number of interaction locations for the first user interface element 200a. For example, the anomalous activity detection system can determine a first fraction for the baseline interaction locations 204a-b and a second fraction for the test interaction locations 202a-c. Based on the above example for a fire hydrant CAPTCHA challenge, the anomalous activity detection system can determine that ninety-three of the two-hundred and nineteen baseline interaction locations 204a-b, e.g., 31/73 based on the interaction locations 204b, and twenty-seven of the sixty test interaction locations 202a-c, e.g., 9/20 based on the interaction locations 202c, are in the first portion 206.

The anomalous activity detection system can determine a difference between the two fractions, e.g., 24/947. When the difference between the two fractions satisfies a threshold difference, e.g., is less than the threshold difference, the anomalous activity detection system can determine that data for the portion 206 indicates that the test interaction locations 202a-c are not likely anomalous. In some examples, the anomalous activity detection system can split the portion 206 into multiple sub-portions, e.g., two or more sub-portions, and repeat the process when the number of baseline interaction locations 204a-b, test interaction locations 202a-c, or both, for the sub-portions, e.g., for each of the sub-portions, satisfies a threshold quantity. The anomalous activity detection system can use the same threshold quantity or different threshold quantities for the baseline interaction locations 204a-b and the test interaction locations 202a-c.

In the above example, the difference is 24/947, or 0.0253. For a threshold difference of 0.05, the anomalous activity detection system can determine that 0.0253 is less than the threshold difference of 0.05. The anomalous activity detection system can determine to repeat the process for sub-portions of the first portion 206, e.g., when each or some of those sub-portions have at least a threshold number of interaction locations.

In some examples, the anomalous activity detection system can perform the analysis for those sub-portions that have at least a threshold number of interaction locations and skip analysis for those sub-portions that do not have at least the threshold number of interaction locations. For instance, the anomalous activity detection system can split the portion 206 into a left and a right sub-portion. The anomalous activity detection system can determine that the quantity of test interaction locations 202a-c and the quantity of baseline interaction locations 204a-b for the left sub-portion each satisfy a threshold quantity and perform analysis on the left-sub-portion. When the anomalous activity detection system determines that a quantity of test interaction locations 202a-c for the right sub-portion does not satisfy the threshold quantity, e.g., irrespective of whether the quantity of baseline interaction locations 204a-b satisfies the threshold number, the anomalous activity detection system can determine to skip analysis of the right sub-portion.

The anomalous activity detection system can classify the test interaction locations, a distribution of the test interaction locations, or both, as likely anomalous when the difference between the fractions does not satisfy the threshold difference. For instance, referring to FIG. 2B, the anomalous activity detection system can determine a quantity of test interaction locations 208a-c and a quantity of baseline interaction locations 210a-b for a second portion 212 of a second user interface element 200b. The anomalous activity detection system can determine that 1/30 of the baseline interaction locations 210a-b, e.g., the baseline interaction location 210b, and 1/2 of the test interaction locations 208a-c are within the second portion 212, e.g., the test interaction location 208c. Based on the difference of 7/15, or 0.4667, the anomalous activity detection system can determine that the difference does not satisfy the threshold difference, e.g., is greater than the threshold difference of 0.05. As a result, the anomalous activity detection system can classify the test interaction locations 210, a distribution for the test interaction locations 210, or both, as likely anomalous.

In some implementations, an anomalous activity detection system analyzes data for multiple user interface elements that were provided for a system to determine whether interaction locations for the system are likely anomalous. For instance, when a quantity of interactions with a user interface element does not satisfy a threshold quantity, the anomalous activity detection system can analyze data for both the first user interface element 200a and the second user interface element 200b.

The sizes of the multiple user interface elements can be the same or different. For example, when the anomalous activity detection system receives data for user interface elements of different sizes, the anomalous activity detection can adjust, e.g., stretch or shrink, one or more of the user interface elements, and adjust the interaction locations accordingly, so that the user interface elements have the same size.

The anomalous activity detection system determines portions 206, 212 of the respective user interface elements 200a-b. The portions 206, 212 can be in the same region of the corresponding user interface element 200*a-b* or in different regions, the latter of which is depicted in FIGS. 2A-B.

The anomalous activity detection system can determine a baseline score and a test score using the determined portions 206, 212. For example, the anomalous activity detection system can determine the scores using a total number of interaction locations across the multiple user interface elements, and a number of interaction locations that are in the corresponding regions. The anomalous activity detection system can determine a score $f_{mix}$ using equation (1), below, when $N_{f1}$ and $N_{f2}$ indicate the total number of interactions in the corresponding portion 206, 212, and $N_{total}$ indicates the total number of interactions with both of the user interface elements 200*a-b* for the respective interaction locations, e.g., baseline or test.

$$f_{mix} = \frac{N_{f1} + N_{f2}}{N_{total}} \quad (1)$$

The anomalous activity detection system can determine a first score $f_{mix1}$ for the baseline interaction locations 204*a-b* and 210*a-b*, e.g., using the baseline interaction locations 204*b* in the first region 206 as $N_{f1}$, the baseline interaction locations 210*b* in the second region 212 as $N_{f2}$, and a total number of the baseline interaction locations 204*a-b* and 210*a-b* as $N_{total}$. The anomalous activity detection system can determine a second score $f_{mix2}$ for the test interaction locations 202*a-c* and 208*a-c*, e.g., using the test interaction locations 202*c* in the first region 206 as $N_{f1}$, the test interaction locations 208*c* in the second region 212 as $N_{f2}$, and a total number of the test interaction locations 202*a-c* and 208*a-c* as $N_{total}$.

The anomalous activity detection system determines a difference between the first score $f_{mix2}$ for the baseline interaction locations and the second score $f_{mix2}$ for the test interaction locations. When the difference satisfies a threshold difference, the anomalous activity detection system can determine that the test interaction locations 202*a-c* and 208*a-c* are likely not anomalous. The anomalous activity detection system can repeat this analysis for smaller subportions of the user interface elements 200*a-b* as discussed above.

The above example included two-hundred and nineteen baseline interaction locations 204*a-b* and sixty test interaction locations 202*a-c* for the first user interface element 200*a*, and one-hundred and fifty baseline interaction locations 210*a-b* and fifty test interaction locations 208*a-c* for the second user interface element 200*b*, with five and twenty-five interaction locations in the portion 212, respectively. Based on this example, the anomalous activity detection system would determine a first score $f_{mix1}$ of 98/369 and a second score $f_{mix2}$ of 26/55, with a difference of 29/140, or 0.2071. In this example, the anomalous detection system determines that the difference does not satisfy the threshold difference, e.g., is greater than the threshold difference of 0.05.

In some implementations, the anomalous activity detection system can determine a quantity of user interface elements to analyze. This can enable the anomalous activity detection system to more accurately detect anomalous activity for systems for which there are less than a threshold amount, e.g., few, interaction locations for any particular user interface element. For instance, the anomalous activity detection system can add, to a list of user interface elements to analyze for a system, another user interface element until a quantity of the interaction locations for all of the user interface elements satisfies, e.g., is greater than or equal to or either, a threshold quantity. Once the anomalous activity detection system has determined the list of user interface elements, the anomalous activity detection system can determine whether the interaction locations for the user interface elements are likely anomalous and to prevent the system from accessing content on another system.

In some implementations, the anomalous activity detection system can determine whether to combine data from multiple different user interface elements. For instance, the anomalous activity detection system can determine a score for the combination of user interface elements. When the score does not satisfy a threshold score, or when a change in the score if another user interface element were added to the list does not satisfy a threshold change, the anomalous activity detection system can determine to skip adding the user interface element to a list of user interface elements to analyze for a system.

For example, the anomalous activity detection system can determine a first entropy of a first user interface element and a second entropy of a combination of the first user interface element and a second user interface element. The second entropy can be a combination of the interaction locations for the separate user interface elements.

When the anomalous activity detection system determines that a difference between the first entropy and the second entropy does not satisfy a threshold entropy difference, e.g., is less than or equal to or either, the anomalous activity detection system can determine to skip adding the second user interface element to a list of user interface elements. When the anomalous activity detection system determines that the difference satisfies the threshold entropy difference, the anomalous activity detection system adds the second user interface element to the list of user interface elements.

In some examples, the anomalous activity detection system can determine a change in the entropy based on a drop in the entropy if the anomalous activity detection system were to add another user interface element to a list of user interface elements whose interaction locations will be analyzed. For instance, when the anomalous activity detection system determines that the entropy score will drop more than a threshold amount, the anomalous activity detection system determines to skip adding the second user interface element to the list of user interface elements. When the anomalous activity detection system determines that the entropy score will not drop more than the threshold amount, the anomalous activity detection system can add the second user interface element to the list of user interface elements.

Figure 3:
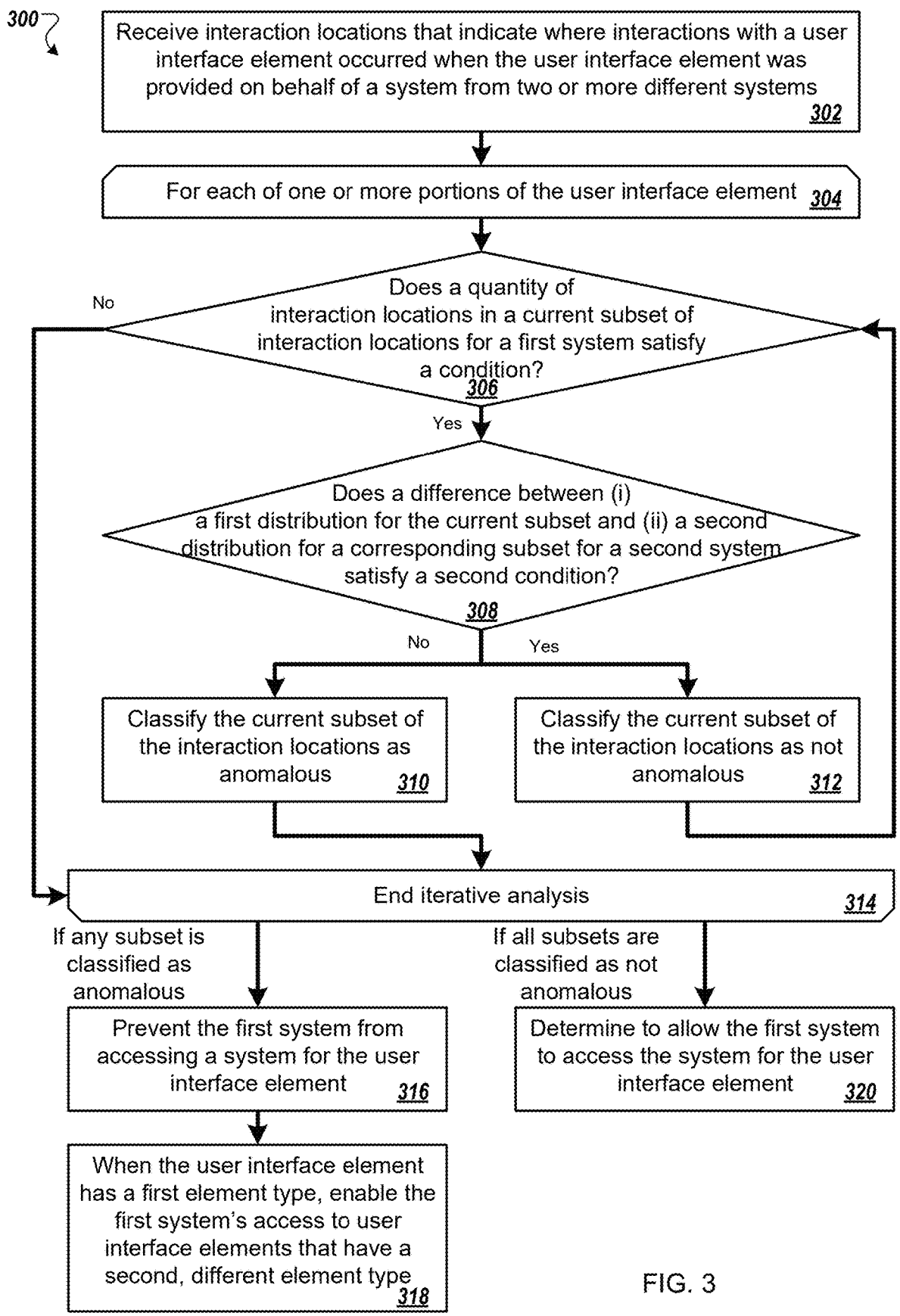
FIG. 3 is a flow diagram of a process for determining whether user interface interactions are likely anomalous.

FIG. 3 is a flow diagram of a process 300 for determining whether user interface interactions are likely anomalous. For example, the process 300 can be used by the anomalous activity detection system 102 from the environment 100.

An anomalous activity detection system receives interaction locations that indicate where interactions with a user interface element occurred when the user interface element was provided on behalf of a respective system from two or more different systems (302). The user interface element can be provided on behalf of the system when the system provides the user interface element to a client device, when the system is an anomalous system and accesses a user interface element on its own behalf, e.g., is a malicious system, or when another system provides the user interface element for the system, e.g., when a user interface, such as a webpage, includes user interface elements from multiple, different systems.

In some implementations, the two or more systems can include at least three baseline systems in addition to the test system, e.g., four or more systems. For instance, the anomalous activity detection system can receive interaction locations for three baseline systems whose baseline interaction locations have at least a threshold likelihood of being not anomalous.

The anomalous activity detection system iteratively analyzes one or more portions of the user interface element (304). For example, the anomalous activity detection system can begin analysis of a first portion that includes the entire user interface element. The anomalous activity detection system can perform the iterative analysis on subsequently smaller portions when a quantity of locations for a current subset of interaction locations in the current portion satisfies a condition, e.g., a threshold value, when interaction locations for a portion are not classified as anomalous, or both. This can provide increased accuracy, security, or both, through determinations of differences between distributions of interaction locations in smaller subsets of user interface elements as well as in entire user interface elements. For example, an anomalous distribution of access requests may appear to be non-anomalous at a certain level of detail, but it may be determined to be anomalous through consideration of a smaller portion of a user interface element. In some implementations, this can enable detection of anomalous activity that is imperceptible to a human.

The anomalous activity detection system can determine a first subset of interaction locations in a current portion of the user interface element for a first system. The first system can be a test system for which the anomalous activity detection system is determining whether the first system should continue to have access to another system, e.g., that stores the user interface element in a memory.

The anomalous activity detection system can determine a second subset of interaction locations in the current portion for a second system. The second system can be a system whose interaction locations are classified as not likely anomalous. In some examples, the anomalous activity detection system can determine a second subset of interaction locations for multiple second systems. The second subset can include the interaction locations of each of the second systems or some of the second systems.

The anomalous activity detection system determines whether a quantity of interaction locations in a current subset of interaction locations for a first system satisfies a condition (306). The condition can be a threshold value, e.g., a minimum number of interaction locations, or another appropriate condition. The anomalous activity detection system can perform this analysis for the baseline interaction locations, the test interaction locations, or both. For example, the anomalous activity detection system can use, as a condition, a threshold value of five for the baseline interaction locations, the test interaction locations, or both. The anomalous activity detection system can use a first condition, e.g., a first threshold value, for the baseline interaction locations, and a second, different condition, e.g., threshold value, for the test interaction locations.

In response to determining that the quantity of interaction locations in the current subset of interaction locations satisfies the condition, the anomalous activity detection system determines whether a difference between a first distribution for the current subset and (ii) a second distribution for a corresponding subset for a second system satisfies a second condition (308). The second condition can be a threshold difference, a degree of similarity, or some other condition. The first distribution can be of the interaction locations for the user interface element when the user interface element was provided on behalf of a first system among the two or more different systems. The second distribution can be of the interaction locations for the user interface element when the user interface element was provided on behalf of a second system among the two or more different systems.

In response to determining that a difference between the first distribution for the current subset and the second distribution for a corresponding subset for a second system does not satisfy the second condition, the anomalous activity detection system classifies the current subset of the interaction locations as anomalous (310). For instance, the anomalous activity detection system can classify the current subset of interaction locations for the first system as anomalous in a database. The database can include data for the interaction locations, e.g., can be a test interaction location database. In some implementations, the anomalous activity detection system can stop the iterative process, e.g., performing steps 306 through 312 for subsequent sub-portions, upon classifying a sub-portion, or corresponding interaction locations, as anomalous.

In some implementations, the anomalous activity detection system can continue the iterative process, e.g., performing steps 306 through 312, until a threshold number of sub-portions or corresponding subsets are classified as anomalous. For instance, after determining that the difference between the first distribution and the second distribution does not satisfy the second condition, the anomalous activity detection system can perform one or more of steps 306 through 312 until the anomalous activity detection system analyzes all portions, sub-portions, or both, of a user interface element, or determines that a quantity of portions classified as anomalous satisfies a third condition, e.g., a threshold quantity.

In response to determining that a difference between a first distribution for the current subset and a second distribution for a corresponding subset for a second system satisfies the second condition, the anomalous activity detection system classifies the current subset of the interaction locations as not anomalous (312). For example, the anomalous activity detection system classifies the current portion, or the interaction locations in the current subset for the current portion, as not anomalous. The anomalous activity detection system can then split the current portion into multiple sub-portions and proceed to step 306.

The anomalous activity detection system ends iterative analysis (314). The anomalous activity detection system can end the iterative analysis for a portion of the image, the entire image, or both. For instance, the anomalous activity detection system can split an image into two portions, e.g., a left and a right portion. The anomalous activity detection system can analyze the left portion of the image, e.g., using one or more of steps 306 through 312. Upon determining that the left portion, or all sub-portions of the left portion, do not have a quantity of interaction locations that satisfy the condition, the anomalous activity detection system can end the iterative analysis of the left portion. The anomalous activity detection system can then perform one or more of steps 306 through 312 for the right portion, e.g., to the extent that the anomalous activity detection system did not complete analysis of the right portion in parallel with analysis of the left portion.

The anomalous activity detection system prevents the first system from accessing a system for the user interface element (316). For example, the anomalous activity detection system can change one or more settings, e.g., firewall settings or security permissions, to prevent the first system from accessing the system for the user interface element. The system for the user interface element can be a system that provided the user interface element on behalf of the first system, a system to which the first system was trying to gain access, or another appropriate type of system.

The anomalous activity detection system can prevent the first system from accessing a system for the user interface element when one or more subsets of interaction locations for the first system were classified as anomalous. For instance, when a quantity of subsets classified as anomalous does not satisfy a threshold quantity, or when any subsets of interaction data are classified as anomalous, the anomalous activity detection system can prevent the first system from accessing another system for the user interface element.

In some implementations, the anomalous activity detection system can analyze user interface elements of different types. A first user interface element type can include a CAPTCHA challenge of a first type, e.g., an image challenge. A second user interface type can include a CAPTCHA challenge of a second type, e.g., an audible or text challenge. In some examples, the type can indicate a difficulty of the CAPTCHA challenge, e.g., a first type can have a first, lower difficulty and a second type can have a second, higher difficulty.

When the user interface element has a first element type, the anomalous activity detection system can enable the first system's access to user interface elements that have a second, different element type (318). The anomalous activity detection system can prevent the first system's access to user interface elements that have the first type. In some examples, the anomalous activity detection system can prevent access to user interface elements of the first type without preventing the first system's access to the system, enabling the first system's access to user interface elements that have the second type, or both. The anomalous activity detection system can enable the first system's access to the user interface elements that have the second, different element type in response to a determination as described above with respect to step 316, e.g., when one or more subsets of interaction locations for the first system were classified as anomalous. This can provide more targeted and more accurate control of access to user interface elements through avoiding blanket restrictions of access to all types of user interface elements where this is not required or justified based on anomalous distributions of interaction locations in respect of a particular element type.

The anomalous activity detection system determines to allow the first system to access the system for the user interface element (320). The anomalous activity detection system can determine to skip preventing the first system from accessing another system for the user interface element.

In some examples, the anomalous activity detection system can determine to allow, or enable, the first system's access to the other system for the user interface element when one or more of the subsets of interaction locations are classified as not anomalous. For instance, the anomalous activity detection system can determine to allow the first system access to the other system when all of the subsets of interaction locations are classified as not likely anomalous or when a quantity of subsets that are classified as not likely anomalous satisfies a threshold quantity.

The order of steps in the process 300 described above is illustrative only, and determining whether user interface interactions are anomalous can be performed in different orders. For example, the anomalous activity detection system can detect interaction locations for each iteration of the iterative analysis, e.g., perform step 302 after step 304.

In some implementations, the process 300 can include additional steps, fewer steps, or some of the steps can be divided into multiple steps. For example, the anomalous activity detection system can perform steps 302, 308 and 310, optionally with step 316; or perform steps 302, 308, and 312, optionally with step 320.

In some implementations, when the anomalous activity detection system determines that the quantity of interaction locations for an entire user interface element does not satisfy the condition, either baseline or test or a combination of both, the anomalous activity detection system can determine whether a quantity of interaction locations for two or more user interface elements satisfies the condition. For instance, the anomalous activity detection system can detect, for two or more user interface elements, second interaction locations that indicate interaction locations for a respective user interface element from the two or more user interface elements when the respective user interface element was provided on behalf of a system from the two or more second systems. The anomalous activity detection system can then perform one or more steps of the process 300 for the two or more user interface elements, e.g., separately or in combination, such as described with reference to FIGS. 2A-B. This can provide a more accurate determination of anomalous or non-anomalous distributions of interaction locations through incorporating data from multiple user interface elements and avoidance of false positives or false negatives based on small quantities of interaction locations below a threshold value, e.g., defined by the condition.

The user interface elements can be any appropriate type of user interface element. For instance, the user interface elements can be CAPTCHA images, ads, e.g., online or offline ads, graphical user interface icons, such as a thumbs up or like icon, or another appropriate user interface element.

When anomalous activity detection system determines that the first system, e.g., publisher, has anomalous interaction locations for ads served with their content, the anomalous activity detection system can prevent the first system from requesting ads from a particular ad server, or cause the ad server to stop providing particular types of ads to the first system, e.g., high value ads.

In some implementations, the anomalous activity detection system can detect anomalous activity that is associated with ad spam, ad fraud, ad attribution, ad conversion, ad uploading, ad delivery, or a combination of two or more of these, based on anomalous interaction locations. For instance, the anomalous activity detection system can receive data for interaction locations that indicate locations at which ads were interacted with, e.g., when the ads were presented on a website, in an application other than a web browser, or both. In this example, anomalous interaction locations can be indicative of a bot that interacts with the ads to increase click-through rates for ads displayed at the corresponding website, in the corresponding application, or both. When the anomalous activity detection system detects anomalous interaction locations for an ad presented on a website or in an application, the anomalous activity detection system can then prevent the website, the application, or both, from retrieving other ads from an ad server, e.g., and prevent future ad spam or ad fraud associated with that website, or that application with respect to the ad server.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
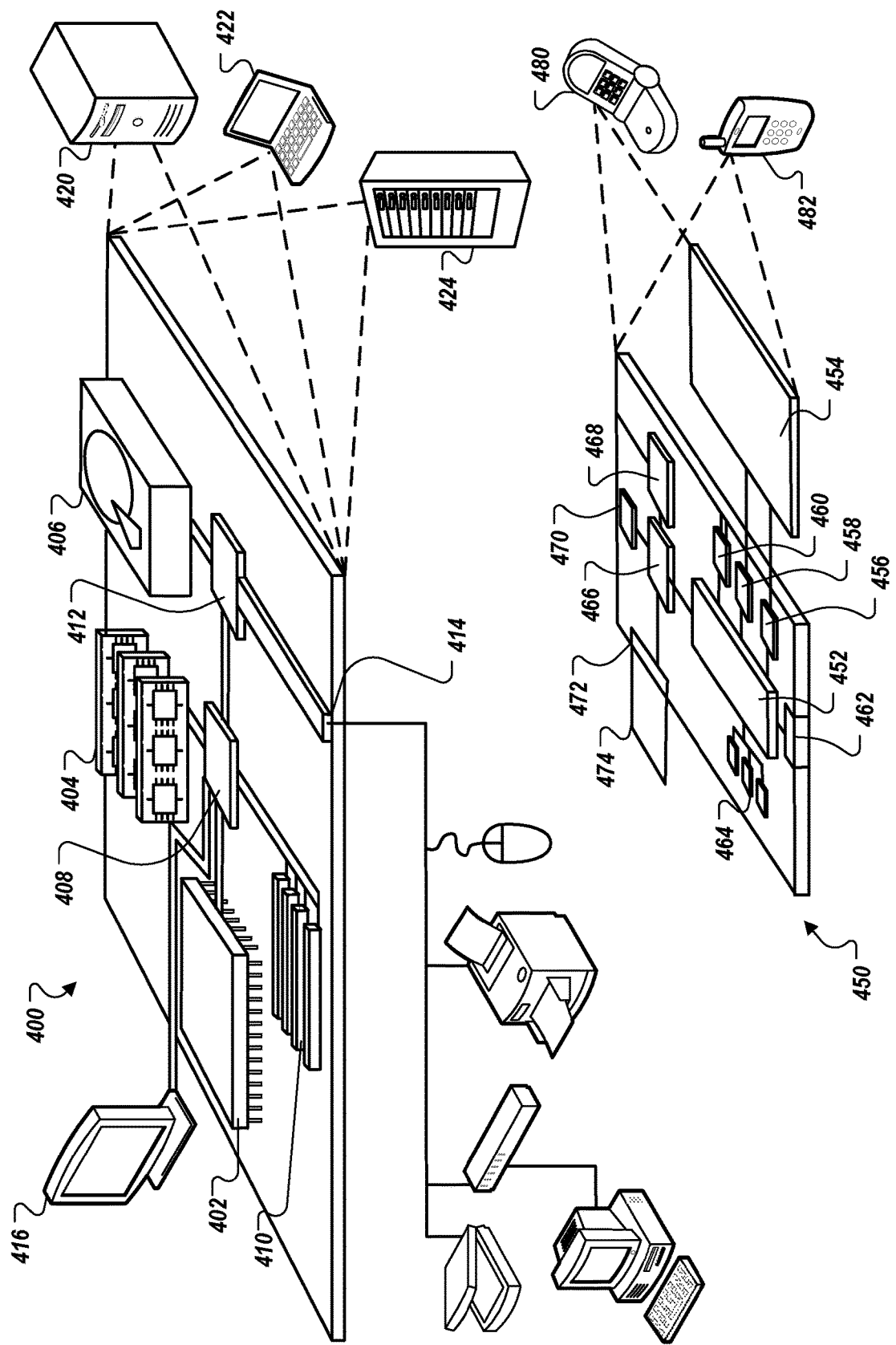
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   receiving, for a user interface element, interaction locations that indicate where interactions with the user interface element occurred when the user interface element was provided on behalf of a first system;
   determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;
   classifying the first distribution of the interaction locations as anomalous in response to the difference not satisfying a condition; and
   preventing the first system from accessing an other system to which the first system was trying to gain access in response to classifying the first distribution of the interaction locations as anomalous, wherein preventing the first system from accessing the other system comprises:
preventing, at the other system and for the user interface element that has a first element type, the first system from accessing all user interface elements that have the first element type; and
enabling the first system's access to user interface elements that have a second, different element type.

2. The method of claim 1, comprising:
receiving, for the user interface element, second interaction locations that indicate where interactions with the user interface element occurred when the user interface element was provided on behalf of a third system;
determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;
classifying the first distribution of the second interaction locations as not anomalous in response to the second difference satisfying the condition; and
determining to allow the third system to access another system to which the third system was trying to gain access in response to classifying the first distribution of the second interaction locations as not anomalous.

3. A computer-implemented method comprising:
receiving, for a user interface element, interaction locations that indicate where interactions with the user interface element occurred when the user interface element was provided on behalf of a first system;
determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;
classifying the first distribution of the interaction locations as anomalous in response to the difference not satisfying a condition; and
preventing the first system from accessing an other system to which the first system was trying to gain access in response to classifying the first distribution of the interaction locations as anomalous;
receiving, for the user interface element that has a first element type, second interaction locations that indicate where interactions with the user interface element occurred when the user interface element was provided on behalf of a third system;
determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;
classifying the first distribution of the second interaction locations as anomalous in response to the second difference not satisfying the condition; and
in response to classifying the first distribution of the second interaction locations as anomalous:
preventing, at another system and for the user interface element that has the first element type, the third system from accessing all user interface elements that have the first element type; and
enabling the third system's access to user interface elements that have a second, different element type.

4. The method of claim 1, wherein determining the difference between (1 the first distribution of the interaction locations and (ii) the second distribution of the interaction locations comprises:
iteratively analyzing data for one or more portions of the user interface element, beginning with a current portion that comprises all of the user interface element and is associated with a current subset of first interaction locations from the first distribution of the interaction locations and a current subset of second interaction locations from the second distribution of the interaction locations, the iterative analyzing comprising:
determining whether a quantity of interaction locations in the current subset satisfies a second condition; and
in response to determining that the quantity of interaction locations in the current subset does not satisfy the second condition and for at least one system, stopping the iterative analysis of the one or more portions of the user interface element.

5. The method of claim 4, comprising:
in response to determining that the quantity of interaction locations in the current subset satisfies the second condition and for at least one system, dividing the current portion into one or more new portions and performing the iterative analysis on the one or more new portions.

6. The method of claim 4, wherein determining the difference between (i) the first distribution of the interaction locations and (ii) the second distribution of the interaction locations is responsive to determining that the quantity of interaction locations in the current subset satisfies the second condition.

7. The method of claim 4, wherein, for a first iteration of the iterative analysis of the data, determining whether the quantity of interaction locations in the current subset satisfies the second condition occurs before determining the difference between (i) the first distribution of the interaction locations and (ii) the second distribution of the interaction locations.

8. A computer-implemented method comprising:
receiving, for a user interface element, interaction locations that indicate where interactions with the user interface element occurred when the user interface element was provided on behalf of a first system;
determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;
classifying the first distribution of the interaction locations as anomalous in response to the difference not satisfying a condition; and
preventing the first system from accessing an other system to which the first system was trying to gain access in response to classifying the first distribution of the interaction locations as anomalous, wherein determining the difference between (i) the first distribution of the interaction locations and (ii) the second distribution of the interaction locations comprises:
iteratively analyzing data for one or more portions of the user interface element, beginning with a current portion that comprises all of the user interface element and is associated with a current subset of first interaction locations from the first distribution of the interaction locations and a current subset of second interaction locations from the second distribution of the interaction locations, the iterative analyzing comprising:
  determining whether a predetermined quantity of iterations is satisfied; and
  in response to determining that the predetermined quantity of iterations is satisfied and for at least one system, stopping the iterative analysis of the one or more portions of the user interface element.

9. A computer-implemented method comprising:
receiving, for a user interface element, interaction locations that indicate where interactions with the user interface element occurred when the user interface element was provided on behalf of a first system;
determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;
classifying the first distribution of the interaction locations as anomalous in response to the difference not satisfying a condition; and
preventing the first system from accessing an other system to which the first system was trying to gain access in response to classifying the first distribution of the interaction locations as anomalous;
receiving, for the user interface element, second interaction locations that indicate where interactions with the user interface element occurred when the user interface element was provided on behalf of a third system;
determining, for the third system, whether a quantity of the second interaction locations for the user interface element when the user interface element was provided on behalf of the third system satisfies a third condition;
in response to determining that the quantity of the second interaction locations satisfies the third condition, determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;
classifying the first distribution of the second interaction locations as anomalous in response to the second difference not satisfying the condition; and
preventing the third system from accessing another system to which the third system was trying to gain access in response to classifying the first distribution of the second interaction locations as anomalous.

10. A computer-implemented method comprising:
receiving, for a user interface element, interaction locations that indicate where interactions with the user interface element occurred when the user interface element was provided on behalf of a first system;
determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;
classifying the first distribution of the interaction locations as anomalous in response to the difference not satisfying a condition; and
preventing the first system from accessing an other system to which the first system was trying to gain access in response to classifying the first distribution of the interaction locations as anomalous;
receiving, for the user interface element, second interaction locations that indicate where interactions with the user interface element occurred when the user interface element was provided on behalf of a third system;
determining, for the third system, whether a quantity of the second interaction locations for the user interface element when the user interface element was provided on behalf of the third system satisfies a third condition;
in response to determining that the quantity of the second interaction locations does not satisfy the third condition:
  receiving, for two or more user interface elements, third interaction locations that indicate interaction locations for a respective user interface element from the two or more user interface elements when the respective user interface element was provided on behalf of a system;
  determining, based on the received second interaction locations, a second difference between (i) a first distribution of the third interaction locations that indicate interaction locations for a respective user interface element from two or more user interface elements when the respective user interface element was provided on behalf of the third system and (ii) a second distribution of the third interaction locations that indicate interaction locations for a respective user interface element from two or more user interface elements when the respective user interface element was provided on behalf of a fourth system;
  classifying the first distribution of the third interaction locations as anomalous in response to the second difference not satisfying the condition; and
  preventing the third system from accessing another system to which the third system was trying to gain access in response to classifying the first distribution of the second interaction locations as anomalous.

11. The method of claim 1, wherein receiving, for the user interface element, the interaction locations comprises receiving, for the user interface element and from the interaction locations, one or more interaction locations that were generated using data received from a touch screen input device, a touch pad device, or a computer mouse input device.

12. A non-transitory computer storage medium encoded with instructions that, when executed by one or more computers, cause the one or more computers to perform operations comprising:
receiving, for a user interface element, interaction locations that indicate where interactions with the user interface element occurred when the user interface element was provided on behalf of a first system;

determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;

classifying the first distribution of the interaction locations as anomalous in response to the difference not satisfying a condition; and preventing the first system from accessing an other system to which the first system was trying to gain access in response to classifying the first distribution of the interaction locations as anomalous, wherein preventing the first system from accessing the other system comprises:

preventing, at the other system and for the user interface element that has a first element type, the first system from accessing all user interface elements that have the first element type; and enabling the first system's access to user interface elements that have a second, different element type.

13. The non-transitory computer storage medium of claim 12, wherein the instructions cause the one or more computers to perform operations comprising:

receiving, for the user interface element, second interaction locations that indicate where interactions with the user interface element occurred when the user interface element was provided on behalf of a third system;

determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;

classifying the first distribution of the second interaction locations as not anomalous in response to the second difference satisfying the condition; and determining to allow the third system to access another system to which the third system was trying to gain access in response to classifying the first distribution of the second interaction locations as not anomalous.

14. The non-transitory computer storage medium of claim 12, wherein the instructions cause the one or more computers to perform operations comprising:

receiving, for the user interface element that has a first element type, second interaction locations that indicate where interactions with the user interface element occurred when the user interface element was provided on behalf of a third system;

determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;

classifying the first distribution of the second interaction locations as anomalous in response to the second difference not satisfying the condition; and in response to classifying the first distribution of the second interaction locations as anomalous:

preventing, at another system and for the user interface element that has the first element type, the third system from accessing all user interface elements that have the first element type; and enabling the third system's access to user interface elements that have a second, different element type.

15. A system comprising:
one or more computers; and
one or more storage devices storing instructions that, when executed by the one or more computers, cause the one or more computers to perform operations comprising:

receiving, for a user interface element, interaction locations that indicate where interactions with the user interface element occurred when the user interface element was provided on behalf of a first system;

determining, based on the received interaction locations, a difference between (i) a first distribution of the interaction locations for the user interface element when the user interface element was provided on behalf of the first system and (ii) a second distribution of the interaction locations for the user interface element when the user interface element was provided on behalf of a second system;

classifying the first distribution of the interaction locations as anomalous in response to the difference not satisfying a condition; and preventing the first system from accessing an other system to which the first system was trying to gain access in response to classifying the first distribution of the interaction locations as anomalous, wherein preventing the first system from accessing the other system comprises:

preventing, at the other system and for the user interface element that has a first element type, the first system from accessing all user interface elements that have the first element type; and enabling the first system's access to user interface elements that have a second, different element type.

16. The system of claim 15, wherein the instructions cause the one or more computers to perform operations comprising:

receiving, for the user interface element, second interaction locations that indicate where interactions with the user interface element occurred when the user interface element was provided on behalf of a third system;

determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;

classifying the first distribution of the second interaction locations as not anomalous in response to the second difference satisfying the condition; and determining to allow the third system to access another system to which the third system was trying to gain access in response to classifying the first distribution of the second interaction locations as not anomalous.

17. The system of claim 15, wherein the instructions cause the one or more computers to perform operations comprising:

receiving, for the user interface element that has a first element type, second interaction locations that indicate where interactions with the user interface element occurred when the user interface element was provided on behalf of a third system;

determining, based on the received second interaction locations, a second difference between (i) a first distribution of the second interaction locations for the user interface element when the user interface element was provided on behalf of the third system and (ii) a second distribution of the second interaction locations for the user interface element when the user interface element was provided on behalf of a fourth system;

classifying the first distribution of the second interaction locations as anomalous in response to the second difference not satisfying the condition; and in response to classifying the first distribution of the second interaction locations as anomalous:
  preventing, at another system and for the user interface element that has the first element type, the third system from accessing all user interface elements that have the first element type; and
  enabling the third system's access to user interface elements that have a second, different element type.

* * * * *